US010621126B2

(12) United States Patent
Hai et al.

(10) Patent No.: US 10,621,126 B2
(45) Date of Patent: Apr. 14, 2020

(54) DELAY CONTROL DEVICE, DELAY CONTROL METHOD AND ELECTRONIC APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Chunxi Hai, Beijing (CN); Runcong Ge, Beijing (CN); Xiaoting Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/534,793

(22) PCT Filed: Oct. 19, 2016

(86) PCT No.: PCT/CN2016/102608
§ 371 (c)(1),
(2) Date: Jun. 9, 2017

(87) PCT Pub. No.: WO2017/181634
PCT Pub. Date: Oct. 26, 2017

(65) Prior Publication Data
US 2018/0189209 A1    Jul. 5, 2018

(30) Foreign Application Priority Data
Apr. 20, 2016    (CN) .......................... 2016 1 0248799

(51) Int. Cl.
*G06F 13/26*    (2006.01)
*G06F 13/40*    (2006.01)
(Continued)

(52) U.S. Cl.
CPC ................ *G06F 13/26* (2013.01); *G06F 1/08* (2013.01); *G06F 13/10* (2013.01); *G06F 13/4027* (2013.01); *G06F 13/4265* (2013.01)

(58) Field of Classification Search
None
See application file for complete search history.

(56) References Cited

U.S. PATENT DOCUMENTS 5,659,800 A * 8/1997 Zhang .................. G06F 3/0227
710/10
5,953,681 A * 9/1999 Cantatore .............. G01N 15/14
702/31

(Continued)

FOREIGN PATENT DOCUMENTS

CN    1060354 A    4/1992
CN    1812317 A    8/2006

(Continued)

OTHER PUBLICATIONS

The First Chinese Office Action dated Apr. 2, 2018; Appln. No. 201610248799.5.

(Continued)

*Primary Examiner* — Henry Tsai
*Assistant Examiner* — Aurangzeb Hassan

(57) ABSTRACT

A delay control device, a delay control method and an electronic apparatus are provided. The delay control device includes: a trigger port, configured to receive a trigger signal; a first interface; a second interface; a control module, configured to disconnect connection between the first interface and the second interface in response to a case that the trigger port receives the trigger signal; and a timing module, configured to carry out timing for a duration; the control module is further configured to connect the first interface and the second interface in response to a case that the timing module completes timing of the duration. The delay control (Continued)

device can achieve a delay control function, prevent program confusion, improve efficiency and save cost.

14 Claims, 4 Drawing Sheets

(51) Int. Cl.
    *G06F 1/08*     (2006.01)
    *G06F 13/10*     (2006.01)
    *G06F 13/42*     (2006.01)

(56) References Cited

U.S. PATENT DOCUMENTS

| | | | |
|---|---|---|---|
| 7,289,436 B2* | 10/2007 | Schaller | H04L 41/0631 |
| | | | 370/225 |
| 2006/0181956 A1 | 8/2006 | Gregorius | |
| 2007/0070206 A1* | 3/2007 | Clark | H04N 5/2251 |
| | | | 348/207.99 |
| 2008/0250196 A1* | 10/2008 | Mori | G11B 20/10 |
| | | | 711/105 |
| 2009/0259787 A1 | 10/2009 | Elgousi et al. | |
| 2013/0342023 A1* | 12/2013 | Li | H02J 5/005 |
| | | | 307/104 |
| 2014/0200871 A1* | 7/2014 | Grace | G06F 8/34 |
| | | | 703/6 |
| 2014/0269343 A1 | 9/2014 | Nagatsuka | |
| 2017/0149518 A1 | 5/2017 | Hartlmueller et al. | |

FOREIGN PATENT DOCUMENTS

| | | |
|---|---|---|
| CN | 1822214 A | 8/2006 |
| CN | 101251832 A | 8/2008 |
| CN | 201142490 Y | 10/2008 |
| CN | 201149696 Y | 11/2008 |
| CN | 104065569 A | 9/2014 |
| CN | 104102869 A | 10/2014 |
| CN | 104572541 A | 4/2015 |
| CN | 105144637 A | 12/2015 |
| CN | 105868131 A | 8/2016 |

OTHER PUBLICATIONS

International Search Report and Written Opinion dated Dec. 30, 2016; PCT/CN2016/102608.

The Third Chinese Office Action dated Apr. 10, 2019; Appln. No. 201610248799.5.

* cited by examiner

DELAY CONTROL DEVICE, DELAY CONTROL METHOD AND ELECTRONIC APPARATUS

TECHNICAL FIELD

Embodiments of the present disclosure relate to a delay control device, a delay control method and an electronic apparatus.

BACKGROUND

With rapid development of computer hardwires, peripheral devices, such as a keyboard, a mouse, a printer, a scanner, a scanning gun and the like, are increasingly introduced day by day. The peripheral devices are connected with a computer generally by means of an interface, such as a Universal Serial Bus (USB) interface, an RS-232 interface, an RS-485 interface and the like.

SUMMARY

An embodiment of the present disclosure provides a delay control device, comprising: a trigger port, configured to receive a trigger signal; a first interface; a second interface; a control module, configured to disconnect connection between the first interface and the second interface in response to a case that the trigger port receives the trigger signal; and a timing module, configured to carry out timing for a duration. The control module is further configured to connect the first interface and the second interface in response to a case that the timing module completes timing of the duration.

For example, in the delay control device according to an embodiment of the present disclosure, in response to a case that the control module disconnects connection between the first interface and the second interface, the control module is further configured to input a standby signal into the first interface, and input a clock signal into the second interface.

For example, in the delay control device according to an embodiment of the present disclosure, the first interface includes a first port, and a second interface includes a second port, the first port is configured to be electrically connected with a clock signal port of a first device interface, and the second port is configured to be electrically connected with a clock signal port of a second device interface.

For example, in the delay control device according to an embodiment of the present disclosure, in response to the case that the control module disconnects connection between the first interface and the second interface, the control module is further configured to input a standby signal into the first port and input a clock signal into the second port.

For example, in the delay control device according to an embodiment of the present disclosure, the first interface includes a first port and a second port, and the second interface includes a third port and a fourth port.

For example, in the delay control device according to an embodiment of the present disclosure, both the first port and the second port are configured to be electrically connected with a clock signal port of a first device interface, and both the third port and the fourth port are configured to be electrically connected with a clock signal port of a second device interface.

For example, in the delay control device according to an embodiment of the present disclosure, in response to the case that the control module disconnects connection between the first interface and the second interface, the control module is further configured to: suspend the first port; input a standby signal into the second port; suspend the third port; and input the clock signal into the fourth port.

For example, in the delay control device according to an embodiment of the present disclosure, the control module disconnects connection between the first interface and the second interface by disconnecting connection between the first port and the third port; and the control module implements connection between the first interface and the second interface by implementing connection between the first port and the third port.

For example, in the delay control device according to an embodiment of the present disclosure, the trigger signal is a falling edge of a data signal sent by the first device interface.

For example, the delay control device according to an embodiment of the present disclosure further comprises a signal generation module, the signal generation module is configured to generate the clock signal and the standby signal.

For example, the delay control device according to an embodiment of the present disclosure further comprises a power supply port, and the power supply port is electrically connected with at least one of a power supply port of the second device interface and a power supply port of the first device interface.

For example, the delay control device according to an embodiment of the present disclosure, further comprises a ground port, and the ground port is electrically connected with a ground port of the first device interface and a ground port of the second device interface.

For example, in the delay control device according to an embodiment of the present disclosure, in response to the trigger signal received by the trigger port or in response to disconnection of the connection between the first interface and the second interface, the timing module carries out timing of the duration.

An embodiment of the present disclosure provides a delay control method, comprising: receiving a trigger signal; in response to receiving the trigger signal, disconnecting connection between a first interface and a second interface of a delay control device; carrying out timing for a duration; and after timing is completed, connecting the first interface and the second interface.

For example, the delay control method according to an embodiment of the present disclosure further comprises: upon disconnecting connection between the first interface and the second interface of the delay control device, inputting a standby signal into the first interface, and inputting a main control clock signal into the second interface.

For example, in the delay control method according to an embodiment of the present disclosure, the first interface includes a first port and a second port, and the second interface includes a third port and a fourth port; disconnecting connection between the first interface and the second interface of the delay control device includes: disconnecting connection between the first port and the third port; and inputting the standby signal into the first interface and inputting the main control clock signal into the second interface includes: suspending the first port; inputting the standby signal into the second port; suspending the third port; and inputting the clock signal into the fourth port.

For example, the delay control method according to an embodiment of the present disclosure further comprises: generating a clock signal and a standby signal.

For example, in the delay control method according to an embodiment of the present disclosure, timing of the duration responds to receiving the trigger signal or disconnecting connection between the first interface and the second interface.

An embodiment of the present disclosure provides a electronic apparatus, comprising: any one of the above-mentioned delay control devices; and a first device interface and a second device interface which are connected with the delay control device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
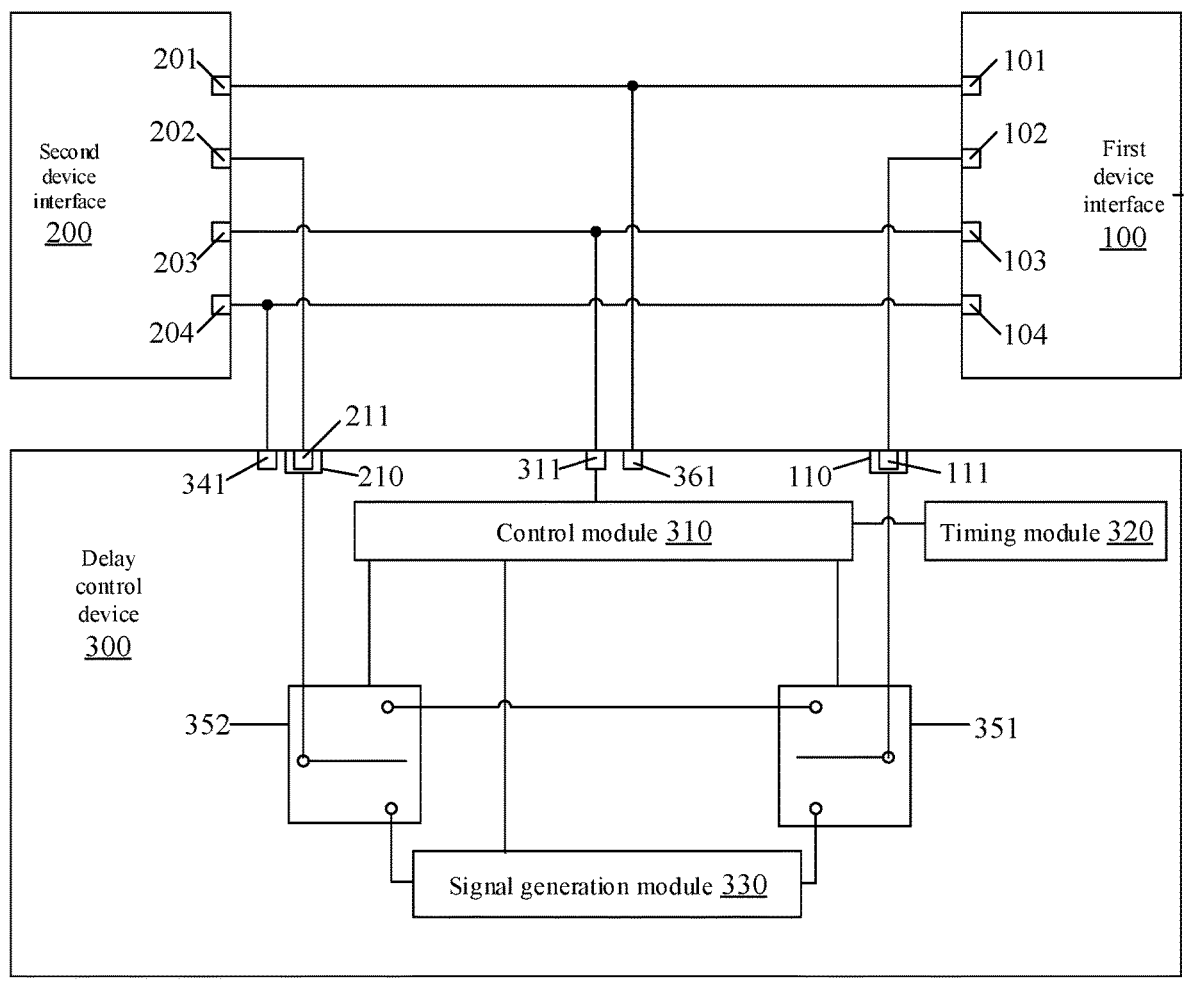
FIG. 1 is a first schematic diagram that a delay control device provided by an embodiment of the present disclosure is connected with a first device interface and a second device interface.

The technical solution of the embodiments of the present disclosure will be described in a clearly and fully understandable way in connection with the drawings. With reference to non-restrictive exemplary embodiments illustrated in the drawings and described in details below, exemplary embodiments of the present disclosure and various characteristics and advantageous details thereof will be more comprehensively illustrated. It should be noted that characteristics illustrated in the drawings do not need to be drawn proportionally. The disclosure omits description on known materials, components and process technologies, so that the exemplary embodiments of the present disclosure are not fuzzy. The given examples only aim to benefit for implementing the exemplary embodiments of the present disclosure and further enabling those skilled in the art to implement the exemplary embodiments. Therefore, those examples should not be understood as limitation to the scope of the embodiments of the present disclosure.

Unless otherwise defined, the technical terms or scientific terms here should be of general meaning as understood by those ordinarily skilled in the art. In the present disclosure, words such as "first", "second" and the like do not denote any order, quantity, or importance, but rather are used for distinguishing different components. In addition, in each embodiment of the present disclosure, same or similar reference signs represent same or similar components.

Peripheral devices are generally connected with a computer via interfaces, such as Universal Serial Bus (USB) interface, RS-232 interface, RS-485 interface or the like.

Due to different delay time periods of various peripheral devices and different transmission speeds of various interfaces, in the process of co-ordination between a peripheral device and the computer or between peripheral devices, program confusion may be caused.

For example, in industrial production, a scanning gun, a computer and a marking machine are coordinated to manage product information, the scanning gun may be connected with the computer via a USB interface, and the marking machine may be connected with the computer via an RS-232 interface. Due to different communication modes of the USB interface and the RS-232 interface and different start-up time of the scanning gun and the marking machine, program confusion may be caused. For example, a transmission speed of the USB interface is higher than that of the RS-232 interface, and the start-up time of the scanning gun is shorter than that of the marking machine, so that the scanning gun excessively rapidly transmits an instruction and the marking machine relatively slowly executes the instruction, which brings about the case that scanning and marking cannot correspond to each other, and at the moment, the matching time of the scanning gun and the marking machine generally needs to be manually controlled, resulting in increase of labor cost and reduction of efficiency.

According to a delay control device provided by an embodiment of the present disclosure, a delay control function is achieved by timing control, timing, and input-output control, and the time interval of executing each instruction is controlled, which prevents program confusion caused by the case that a receiving device cannot timely make a response due to an excessively high signal input speed and an excessively low device execution speed, thereby avoiding labor, time and material cost increased by secondary input of information and improving efficiency.

As illustrated in FIG. 1, an embodiment of the present disclosure provides a delay control device 300, including: a trigger port 311, configured to receive a trigger signal; a first interface 110; a second interface 210; a control module 310, configured to disconnect connection between the first interface 110 and the second interface 210 in response to a case that the trigger port 311 receives the trigger signal; and a timing module 320, configured to carry out timing for a duration; the control module 310 is further configured to connect the first interface 110 and the second interface 210 in response to a case that the timing module 320 completes timing of the duration.

For example, the delay control device 300 provided by one embodiment of the present disclosure further includes a signal generation module 330, and the signal generation module 330 is configured to generate a clock signal and a standby signal. Therefore, a signal generation apparatus does not need to be separately provided besides the delay control device 300, and the delay control device 300 is convenient to use.

For example, the control module 310 sends out a control signal of carrying out signal generation; and in response to the control signal, the signal generation module 330 can generate a clock signal and a standby signal. It should be noted that the embodiment of the present disclosure includes, but is not limited thereto, and the signal generation module 330 may also start to carry out signal generation upon being powered on without responding to the control signal sent out by the control module 310.

In response to the case that the control module 310 disconnects connection between the first interface 110 and the second interface 210, the control module 310 is further configured to: input the standby signal into the first interface, and input the clock signal into the second interface. For example, the control module 310 inputs the standby signal into the first interface and inputs the clock signal into the second interface when disconnecting connection between the first interface and the second interface.

For example, in the delay control device 300 provided by one embodiment of the present disclosure, the first interface 110 includes a first port 111, and the second interface 210 includes a second port 211.

For example, in the delay control device 300 provided by one embodiment of the present disclosure, the first port 111 is electrically connected with a clock signal port 102 of a first device interface 100, and the second port 211 is electrically connected with a clock signal port 202 of a second device interface 200. For example, both the clock signal port 102 of the first device interface 100 and the clock signal port 202 of the second device interface 200 are used for receiving or sending the clock signals.

In the delay control device 300 provided by one embodiment of the present disclosure, the control module 310 is configured to: when the trigger signal is received, disconnect connection between the first interface 110 and the second interface 210 by disconnecting connection between the first port 111 and the second port 211. In response to the case that the control module 310 disconnects connection between the first interface 110 and the second interface 210, the control module 310 is further configured to: input the standby signal into the first port 111, and input the clock signal into the second port 211. For example, the control module 310 inputs the standby signal into the first port 111 and inputs the clock signal into the second port 211 upon disconnecting connection between the first port 111 and the second port 211. Then, in response to the case that the timing module 320 completes timing of the duration, the control module 310 is further configured to: disconnect connection of the first port 111 and the standby signal, disconnect connection of the second port 211 and the clock signal, and by connecting the first port 111 and the second port 211, implement connection of the first interface and the second interface 210.

For example, the first port 111 is connected with the clock signal port 102 of the first device interface 100; and the control module 310 inputs the standby signal into the first port 111, i.e., the standby signal is input into the clock signal port 102 of the first device interface 100 via the first port 111 so as to ensure that a first device is in a standby state and temporarily stops transmission of data information. Meanwhile, the second port 211 is connected with the clock signal port 202 of the second device interface; and the control module 310 inputs the clock signal into the second port 211, i.e., the clock signal is input into the clock signal port 202 of the second device interface 200 via the second port 211 so as to ensure that a second device is in a normal working state. The first device may be a sending device (e.g., the scanning gun), and the second device may be a receiving device (e.g., the computer).

For example, the delay control device 300 includes a first switch 351 and a second switch 352, both the first switch 351 and the second switch 352 are bilateral switches, a first end of the first switch 351 is electrically connected with a first end of the second switch 352, a second end of the first switch 351 is electrically connected with a standby signal output port of the signal generation module 330, a second end of the second switch 352 is electrically connected with a clock signal output port of the signal generation module 330, a third end of the first switch 351 is electrically connected with the first port 111, and a third end of the second switch 352 is electrically connected with the second port 211. The control module 310 implements connection or disconnection between the first interface 110 and the second interface 210 (or connection or disconnection between the first port 111 and the second port 211) by controlling a connection state between all end points of the first switch 351 and the second switch 352. For example, in a default state, the control module 310 controls the third end of the first switch 351 and the first end of the first switch 351 to be connected and controls the third end of the second switch 352 and the first end of the second switch 352 to be connected, and in this case, the clock signal port 102 of the first device interface 100 and the clock signal port 202 of the second device interface 200 are connected by the first switch 351 and the second switch 352. When the control module 310 receives the trigger signal by the trigger port 311, the control module 310 controls the third end of the first switch 351 and the second end of the first switch 351 to be connected, and meanwhile, the control module 310 also controls the third end of the second switch 352 and the second end of the second switch 352 to be connected; in this case, the standby signal generated by the signal generation module 330 is input into the clock signal port 102 of the first device interface by the first switch 351 and the first port 111, and meanwhile, the clock signal generated by the signal generation module 330 is input into the clock signal port 202 of the second device interface by the second switch 352 and the second port 211.

It should be noted that in FIG. 1, connection or disconnection between the first interface 110 and the second interface 210 is illustrated by a connection relationship between the end points of the first switch 351 and the second switch 352, which is only exemplary description, and aims to facilitate understanding the embodiments of the present disclosure. In the embodiments of the present disclosure, connection or disconnection between the first interface 110 and the second interface 210 may be implemented in other modes, and do not need to be implemented by the switches 351 and 352, which is not limited by the present disclosure.

For example, the trigger port 311 is electrically connected with a data transmission port 103 of the first device interface 100 and a data transmission port 203 of the second device interface 200. When the first device interface 100 sends a data signal to the second device interface 200, the trigger port 311 can also receive the data signal. The data signal may be used as the trigger signal. For example, the trigger port 311 may also input another signal serving as the trigger signal, as long as the input trigger signal is guaranteed to be synchronous with data sent by the first device interface 100.

For example, in the delay control device 300 provided by one embodiment of the present disclosure, the trigger signal is the falling edge of the data signal sent by the first device interface 100. It should be noted that the trigger signal in the embodiment of the present disclosure includes, but not limited to, the falling edge of the data signal sent by the first device interface 100, and may also be the rising edge or other signal(s).

The delay control device 300 provided by one embodiment of the present disclosure further includes a power supply port 341, and the power supply port 341 is electrically connected with at least one of a power supply port 204 of the second device interface 200 and a power supply port 104 of the first device interface 100. For example, the delay control device 300 can acquire electric energy from at least one of the power supply port 104 of the first device interface 100 and the power supply port 104 of the first device interface 100 by the power supply port 341, and therefore it is not necessary to separately provide a power supply for the delay control device 300. Therefore, the delay control device 300 is convenient to use, saves cost and can reduce volume and weight.

For example, the delay control device 300 provided by one embodiment of the present disclosure further includes: a ground port 361, and the ground port 361 is electrically connected with a ground port 104 of the first device interface and a ground port 204 of the second device interface 200. Or, the ground port 361 is directly grounded.

For example, in the delay control device 300 provided by one embodiment of the present disclosure, in response to the trigger signal received by the trigger port 311 or in response to disconnection of the connection between the first interface 110 and the second interface 210, the timing module 320 carries out timing for a certain duration (e.g., a certain preset duration). For example, when the control module 310 disconnects connection between the first interface 110 and the second interface 210 by controlling the connection state of the first switch 351 and the second switch 352, the timing module 320 starts to perform timing. When the duration is reached, the timing module 310 stops timing, and the control module 310 reconnects the first interface 110 and the second interface 210.

For example, the preset duration may be regulated according to delay conditions of different devices and different transmission speeds of the interfaces. For example, the preset duration may be regulated by changing an execution program in the delay control device.

For example, the delay control device provided by an embodiment of the present disclosure may be implemented by a Programmable Logic Controller (PLC), a Single Chip Micyoco (SCM) or other similar device or chip capable of achieving a delay control function.

For example, the delay control device provided by an embodiment of the present disclosure is applicable to the USB interface (e.g., a type-A USB interface) and other similar interface. For example, the delay control device provided by an embodiment of the present disclosure may be an apparatus for controlling USB data transmission time.

The first device interface 100 may be a data connection interface of the sending device, the second device interface 200 may be a data connection interface of the receiving device, and vice versa. For example, the first device interface 100 may be a USB type-A female socket, the second device interface 200 may be a USB type-A plug, and vice versa. For another example, the first device interface 100 may be a connection interface for a scanning gun (BCR) terminal, and the second device interface 200 may be a connection interface for a computer side. Both the data transmission port 103 of the first device interface 100 and the data transmission port 203 of the second device interface 200 can be used for sending and receiving data. The data transmission port 103 of the first device interface 100 and the data transmission port 203 of the second device interface 200 are connected with each other, the power supply port 101 of the first device interface and the power supply port 201 of the second device interface 200 are connected with each other, and the ground port 104 of the first device interface 100 and the ground port 204 of the second device interface 200 are connected with each other.

Figure 2:
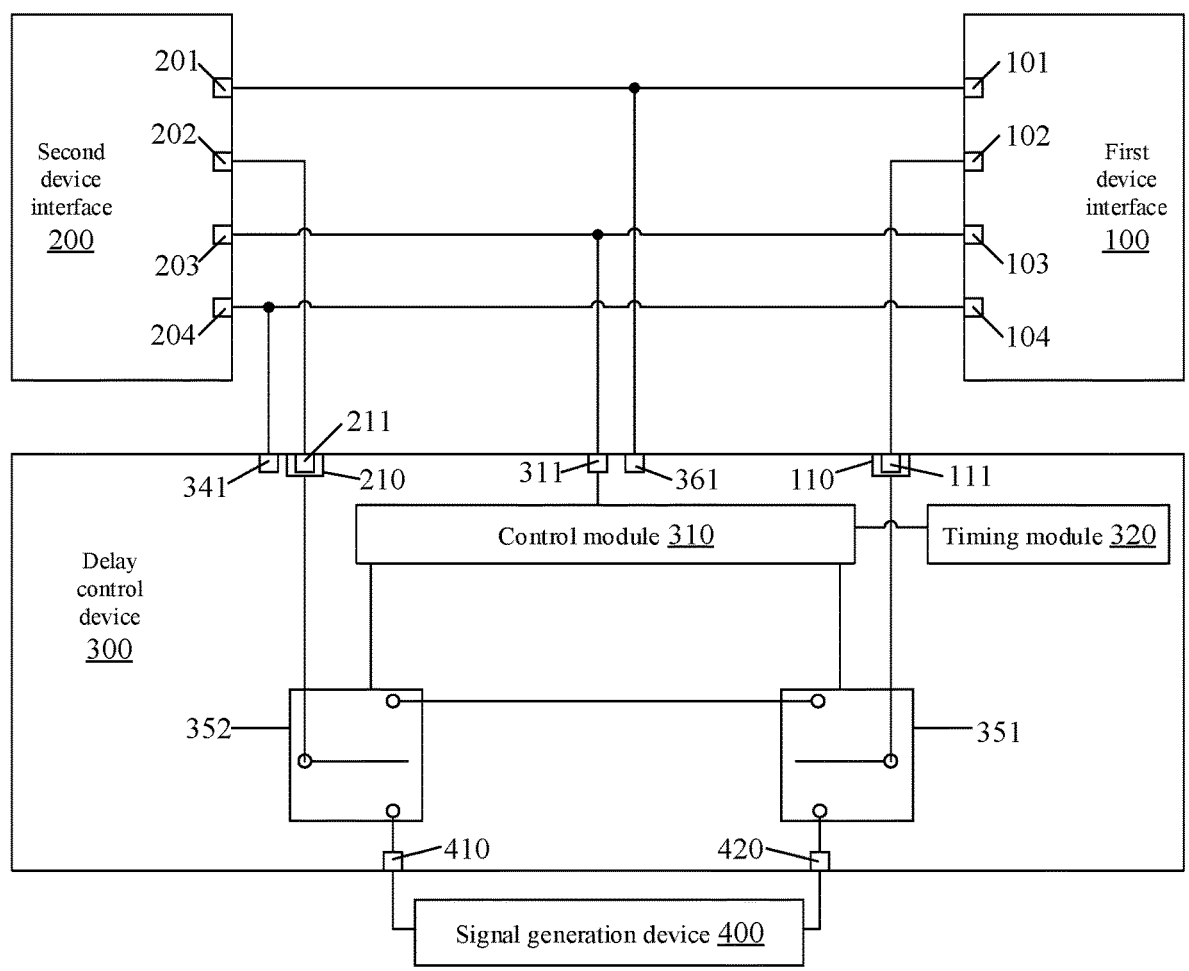
FIG. 2 is a second schematic diagram that a delay control device provided by an embodiment of the present disclosure is connected with the first device interface and the second device interface.

As illustrated in FIG. 2, an embodiment of the present disclosure provides a delay control device 300. The difference between the delay control device 300 illustrated in FIG. 2 and the delay control device illustrated in FIG. 1 includes: the delay control device illustrated in FIG. 1 includes the signal generation module 330, but the delay control device illustrated in FIG. 2 does not include the signal generation module. The delay control device illustrated in FIG. 2 includes a clock signal port 410 and a standby signal port 420. A signal generation device 400 generates a clock signal and a standby signal, sends the generated clock signal to the clock signal port 410, and sends the generated standby signal to the standby signal port 420. The clock signal port 410 is electrically connected with the second end of the second switch 352, and the standby signal port 420 is electrically connected with the second end of the first switch 351.

For example, in a default state, the control module 310 controls the third end of the first switch 351 and the first end of the first switch 351 to be connected and controls the third end of the second switch 352 and the first end of the second switch 352 to be connected, i.e., the clock signal port 102 of the first device interface 100 is connected with the clock signal port 202 of the second device interface 200 by the first switch 351 and the second switch 352. When the control module 310 receives the trigger signal by the trigger port 311, the control module 310 controls the third end of the first switch 351 and the second end of the first switch 351 to be connected, and the control module 310 controls the third end of the second switch 352 and the second end of the second switch 352 to be connected. For example, the control module 310 inputs the standby signal generated by the signal generation device 400 into the clock signal port 102 of the first device interface by controlling connection of the standby signal port 420, the first switch 351 and the first port 111; and meanwhile, the control module 310 inputs the clock signal generated by the signal generation device 400 into the clock signal port 202 of the second device interface 200 by controlling connection of the clock signal port 410, the second switch 352 and the second port 211.

Similarities of the delay control device as illustrated in FIG. 2 and the delay control device illustrated in FIG. 1 are not repeated herein.

Figure 3:
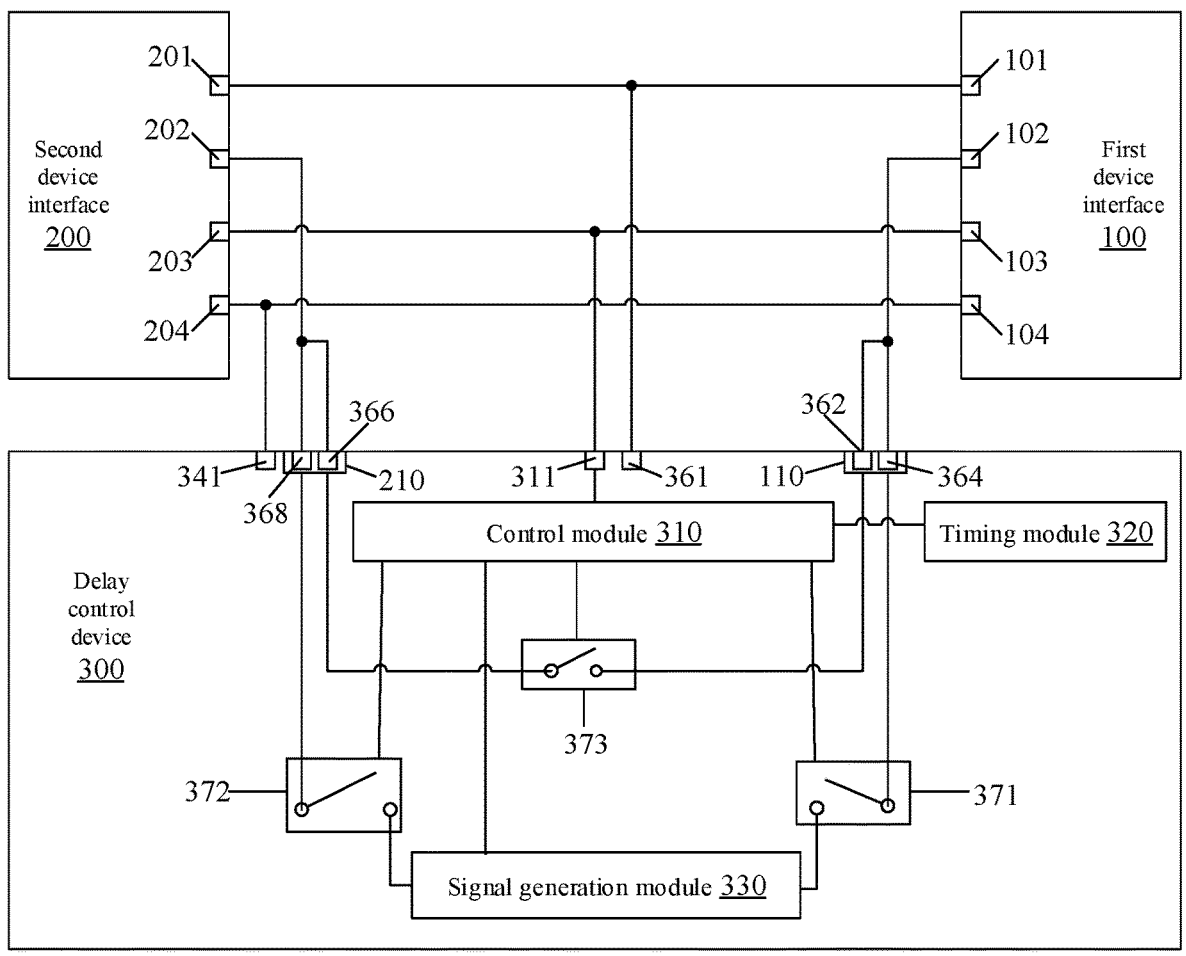
FIG. 3 is a third schematic diagram that a delay control device provided by an embodiment of the present disclosure is connected with the first device interface and the second device interface.

As illustrated in FIG. 3, an embodiment of the present disclosure provides a delay control device 300, including: a trigger port 311, configured to receive a trigger signal; a first interface 110; a second interface 210; a control module 310, configured to disconnect connection between the first interface 110 and the second interface 210 in response to a case that the trigger port 311 receives the trigger signal; and a timing module 320, configured to carry out timing for a duration; the control module 310 is further configured to connect the first interface 110 and the second interface 210 in response to a case that the timing module 320 completes timing of the duration.

For example, the difference of the delay control device illustrated in FIG. 3 and the delay control device as illustrated in FIG. 1 includes: both the first interface 110 and the second interface 210 of the delay control device as illustrated in FIG. 3 include two ports. The first interface 110 includes a first port 362 and a second port 364, and a second interface 210 includes a third port 366 and a fourth port 368.

For example, in the delay control device provided by one embodiment of the present disclosure, both the first port 362 and the second port 364 are electrically connected with the clock signal port 102 of the first device interface 100, and both the third port 366 and the fourth port 368 are electrically connected with the clock signal port 202 of the second device interface 200.

For example, in the delay control device provided by one embodiment of the present disclosure, in response to the case that the control module 310 disconnects connection between the first interface 110 and the second interface 210, the control module 310 is further configured to: suspend the first port 362; input a standby signal into the second port 364; suspend the third port 366; and input a clock signal into the fourth port 368.

For example, in the delay control device provided by one embodiment of the present disclosure, the control module 310 disconnects connection between the first interface 110 and the second interface 210 by disconnecting connection between the first port 362 and the third port 366; and the control module 310 implements connection between the first interface 110 and the second interface 210 by implementing connection between the first port 362 and the third port 366.

For example, in response to the case that the timing module 320 completes timing of the duration, the control module 310 is further configured to: disconnect connection between the second port 364 and the standby signal, and suspend the second port 364; disconnect connection between the fourth port 368 and the clock signal and suspend the fourth port 368; and implement connection between the first interface 110 and the second interface 210 by connecting the first port 362 and the third port 366.

For example, the delay control device 300 includes a first switch 371, a second switch 372 and a third switch 373, a first end of the first switch 371 is electrically connected with a standby signal output port of a signal generation module 330, a second end of the first switch 371 is electrically connected with the second port 364, a first end of the second switch 372 is electrically connected with a clock signal output port of the signal generation module 330, a second end of the second switch 372 is electrically connected with the fourth port 368, a first end of the third switch 373 is electrically connected with the first port 362, and a second end of the third switch 373 is electrically connected with the third port 366. In a default state, the control module 310 controls to: (1) connect the first end of the third switch 373 and the second end of the third switch 373; (2) disconnect the first end of the first switch 371 and the second end of the first switch 371; and (3) disconnect the first end of the second switch 372 and the second end of the second switch 372. In this case, a clock signal port 102 of the first device interface 100 is connected with a clock signal port 202 of the second device interface 200 via the first port 362, the third switch 373 and the third port 366, and the second port 364 and the fourth port 368 are suspended. However, when the control module 310 receives the trigger signal via the trigger port 311, the control module 310 controls to: (1) disconnect the first end of the third switch 373 and the second end of the third switch 373; (2) connect the first end of the first switch 371 and the second end of the first switch 371; and (3) connect the first end of the second switch 372 and the second end of the second switch 372. In this case, the standby signal generated by the signal generation module 330 is input into the clock signal port 102 of the first device interface 100 via the first switch 371 and the second port 364, the clock signal generated by the signal generation module 330 is input into the clock signal port 202 of the second device interface 200 via the second switch 372 and the fourth port 368, and the first port 362 and the third port 366 are suspended.

It should be noted that in FIG. 3, connection or disconnection between the first interface 110 and the second interface 210 is implemented by connection or disconnection by the first switch 371, the second switch 372 and the third switch 373, which is only exemplary description, and aims to facilitate understanding the embodiments of the present disclosure. In the embodiments of the present disclosure, connection or disconnection between the first interface 110 and the second interface 210 may also be implemented in other mode(s), and is not necessary to be implemented by the first switch 371, the second switch 372 and the third switch 373, which is not limited by the present disclosure.

Similarities of the delay control device illustrated in FIG. 3 and the delay control device as illustrated in FIG. 1 are not repeated herein.

Figure 4:
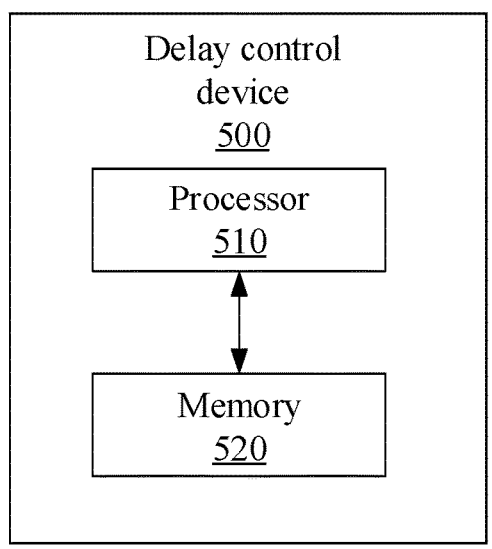
FIG. 4 is a schematic diagram of a delay control device provided by an embodiment of the present disclosure.

For example, as illustrated in FIG. 4, an embodiment of the present disclosure provides a delay control device 500, including a processor 510 and a memory 520. All parts of the delay control device 500 may be directly or indirectly communicated with each other, and for example, all the parts of the delay control device 500 may send and receive data and/or signals mutually.

In some embodiments, the processor 510 can process data signals and control other component(s) in the delay control device 500 to execute expected functions. The memory 520 can store instructions and/or data executed by the processor 510. For example, the memory 520 may include various forms of readable storage media, e.g., a volatile memory and/or a nonvolatile memory. The volatile memory, for example, may include a Random Access Memory (RAM) and/or a cache and the like. The nonvolatile memory, for example, may include a RAM, a hard disk, a flash memory and the like. One or a plurality of computer program instructions can be stored on the computer readable storage medium, the processor 510 can operate the program instructions so as to implement a delay control method below-mentioned in an embodiment of the present disclosure (implemented by the processor).

For example, the delay control device 500 may be a hard disk implementation mode of the delay control devices 300 as illustrated in FIG. 1 to FIG. 3. The control module 310, the timing module 320, the signal generation module 330 and other modules or parts can achieve respective functions in a mode that the processor 510 operates the program instructions stored in the memory 520.

For another example, the delay control devices 300 as illustrated in FIG. 1 to FIG. 3 may also be implemented as special hardware devices, and are used for implementing some or all functions of the embodiments of the present disclosure. For example, the delay control devices 300 as illustrated in FIG. 1 to FIG. 3 may be Field Programmable Gate Arrays (FPGA), Application Specific Integrated Circuits (ASIC), Digital Signal Processors (DSP) and other programmable logic control devices.

Figure 5:
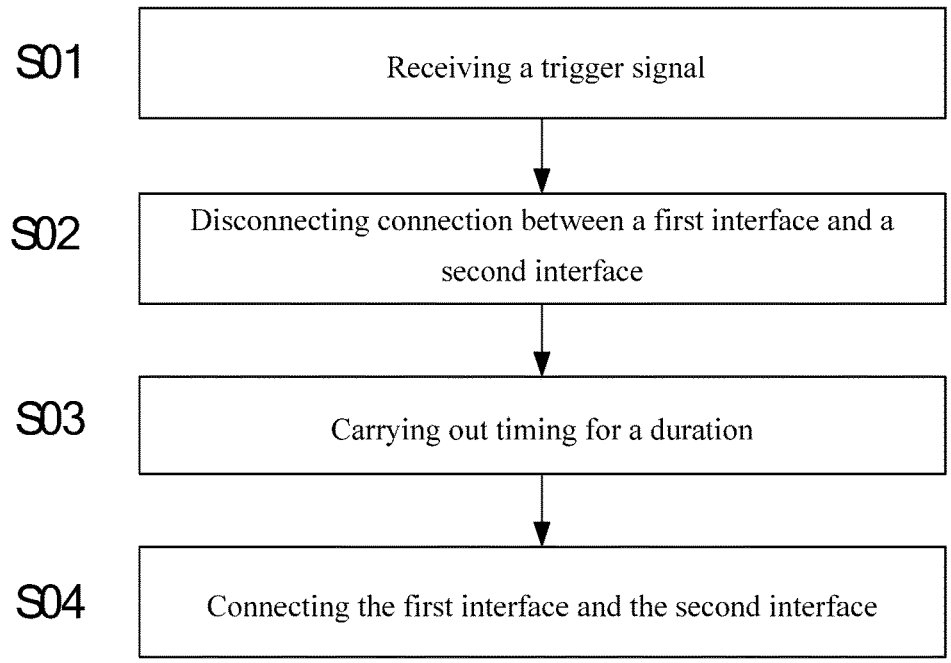
FIG. 5 is a first flow chat of a delay control method provided by an embodiment of the present disclosure.

As illustrated in FIG. 5, an embodiment of the present disclosure further provides a delay control method, including the following operations:

S01: receiving a trigger signal;

S02: in response to receiving the trigger signal, disconnecting connection between a first interface and a second interface of a delay control device;

S03: carrying out timing for a duration; and

S04: after timing is completed, connecting the first interface and the second interface.

For example, the delay control method as illustrated in FIG. 5 further includes: upon disconnecting connection between the first interface and the second interface of the delay control device, inputting a standby signal into the first interface, and inputting a main control clock signal into the second interface.

Figure 6:
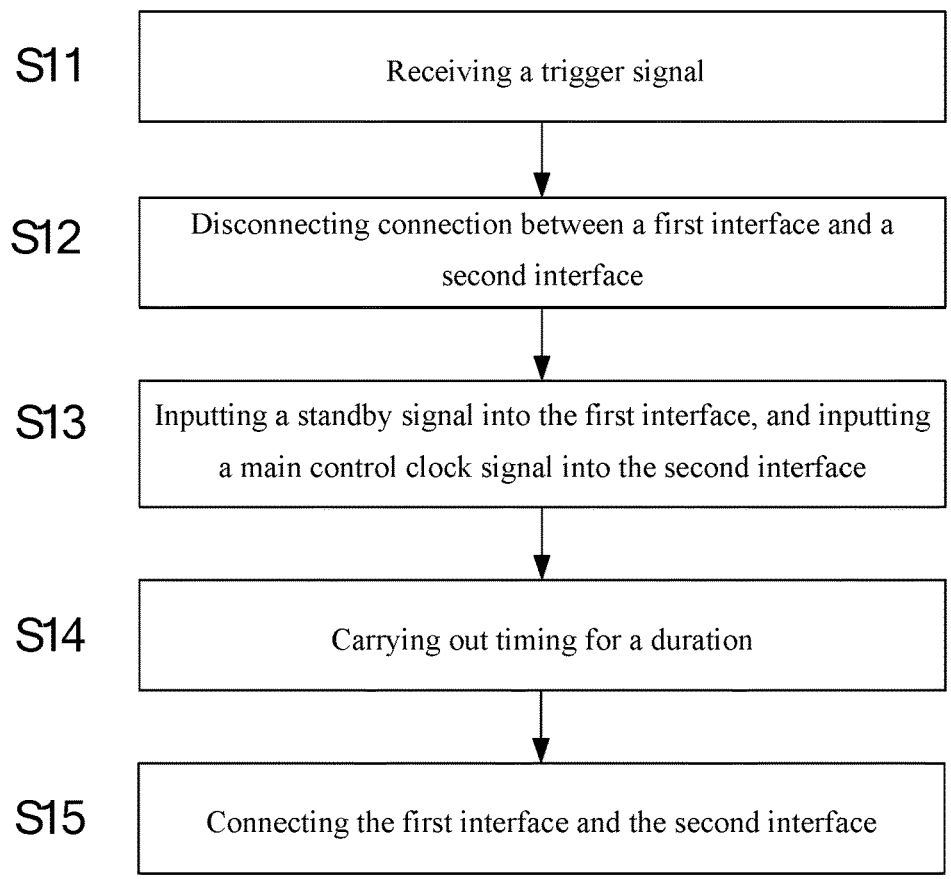
FIG. 6 is a second flow chat of a delay control method provided by an embodiment of the present disclosure.

For example, a delay control method illustrated in FIG. 6 includes the following operations:

S11: receiving a trigger signal;

S12: in response to receiving the trigger signal, disconnecting connection between a first interface and a second interface of a delay control device;

S13: upon disconnecting connection between the first interface and the second interface of the delay control device, inputting a standby signal into the first interface, and inputting a main control clock signal into the second interface;

S14: carrying out timing for a duration; and

S15: after timing is completed, connecting the first interface and the second interface.

For example, in the delay control method provided by one embodiment of the present disclosure, the first interface includes a first port and a second port, and the second interface includes a third port and a fourth port. The disconnecting connection between the first interface and the second interface of the delay control device includes: disconnecting connection between the first port and the third port. The inputting the standby signal into the first interface and inputting the clock signal into the second interface includes: suspending the first port; inputting the standby signal into the second port; suspending the third port; and inputting the clock signal into the fourth port.

For example, the delay control method provided by one embodiment of the present disclosure further includes: generating the clock signal and the standby signal.

For example, in the delay control method provided by one embodiment of the present disclosure, in response to receiving the trigger signal or disconnecting connection between the first interface and the second interface, timing of the duration is started.

An embodiment of the present disclosure further provides an electronic apparatus, including: the delay control device provided by any one embodiment of the present disclosure; and a first device (e.g., a sending device) connected with the delay control device. The first device interface is connected between the delay control device and the first device. The first device interface may be one portion of the first device, and may also be independent of the first device.

For example, the electronic apparatus is a scanning gun integrated with the delay control device provided by any one embodiment of the present disclosure.

An embodiment of the present disclosure further provides an electronic apparatus, including: the delay control device provided by any one embodiment of the present disclosure; and a second device (e.g., a receiving device) connected with the delay control device. The second device interface is connected between the delay control device and the second device. The second device interface may be one portion of the second device, and may also be independent of the second device.

For example, the electronic apparatus is a computer or a marking machine integrated with the delay control device provided by any one embodiment of the present disclosure.

An embodiment of the present disclosure further provides an electronic apparatus, including: the delay control device provided by any one embodiment of the present disclosure; a first device (e.g., a sending device) connected with the delay control device; and a second device (e.g., a receiving device) connected with the delay control device.

An electronic apparatus provided by an embodiment of the present disclosure may further include: the delay control device provided by any one embodiment of the present disclosure; and a first device interface and a second device interface which are connected with the delay control device.

According to the delay control device, the delay control method and the electronic apparatus which are provided by the embodiments of the present disclosure, a delay control function is achieved by timing control, timing and input output control, a time interval of executing each instruction is controlled, and program confusion caused by a case that the second device cannot timely make a response due to an excessively high signal input speed and an excessively low device execution speed is prevented, thereby avoiding labor, time and material cost increased by secondary input of information and improving efficiency.

Although the disclosure has been described above in great detail with general descriptions and specific embodiments, on the basis of the embodiment of the disclosure, some changes or improvements may be made, which is apparent to those skilled in the art. Therefore, all such changes or improvements without departing from the spirit of the disclosure are within the scope of the claims of the disclosure.

The application claims priority to the Chinese patent application No. 201610248799.5, filed Apr. 20, 2016, the entire disclosure of which is incorporated herein by reference as part of the present application.

What is claimed is:

1. A delay control device, comprising:
   a trigger port, configured to receive a trigger signal;
   a first interface;
   a second interface;
   a control module, configured to disconnect connection between the first interface and the second interface in response to a case that the trigger port receives the trigger signal; and
   a timing module, configured to carry out timing for a duration,
   wherein the control module is further configured to connect the first interface and the second interface in response to a case that the timing module completes timing of the duration,
   the first interface comprises a first port, and a second interface comprises a second port,
   the first port is configured to be electrically connected with a clock signal port of a first device interface, and the second port is configured to be electrically connected with a clock signal port of a second device interface, and
   in response to the case that the control module disconnects connection between the first interface and the second interface, the control module is further configured to input a standby signal into the first port and input a clock signal into the second port.

2. The delay control device according to claim 1, wherein the trigger signal is a falling edge of a data signal sent by the first device interface.

3. The delay control device according to claim 1, further comprising a signal generation module, wherein the signal generation module is configured to generate a clock signal and a standby signal.

4. The delay control device according to claim 1, further comprising a power supply port, wherein the power supply port is electrically connected with at least one of a power supply port of a second device interface and a power supply port of a first device interface.

5. The delay control device according to claim 1, further comprising a ground port, wherein the ground port is electrically connected with a ground port of a first device interface and a ground port of a second device interface.

6. The delay control device according to claim 1, wherein in response to the trigger signal received by the trigger port or in response to disconnection of the connection between the first interface and the second interface, the timing module carries out timing of the duration.

7. A delay control method, comprising:
receiving a trigger signal;
in response to receiving the trigger signal, disconnecting connection between a first interface and a second interface of a delay control device;
carrying out timing for a duration; and
after timing is completed, connecting the first interface and the second interface,
wherein the delay control method further comprises:
upon disconnecting connection between the first interface and the second interface of the delay control device, inputting a standby signal into the first interface, and inputting a main control clock signal into the second interface,
the first interface comprises a first port and a second port, and the second interface comprises a third port and a fourth port;
the disconnecting connection between the first interface and the second interface of the delay control device comprises: disconnecting connection between the first port and the third port; and
the inputting the standby signal into the first interface and inputting the main control clock signal into the second interface comprises:
suspending the first port;
inputting the standby signal into the second port;
suspending the third port; and
inputting the clock signal into the fourth port.

8. The delay control method according to claim 7, further comprising:
generating a clock signal and a standby signal.

9. The delay control method according to claim 7, wherein timing of the duration responds to receiving the trigger signal or disconnecting connection between the first interface and the second interface.

10. An electronic apparatus, comprising:
the delay control device according to claim 1; and
a first device interface and a second device interface which are connected with the delay control device.

11. A delay control device, comprising:
a trigger port, configured to receive a trigger signal;
a first interface;
a second interface;
a control module, configured to disconnect connection between the first interface and the second interface in response to a case that the trigger port receives the trigger signal; and
a timing module, configured to carry out timing for a duration,
wherein the control module is further configured to connect the first interface and the second interface in response to a case that the timing module completes timing of the duration,
the first interface comprises a first port and a second port, and the second interface comprises a third port and a fourth port, and
both the first port and the second port are configured to be electrically connected with a clock signal port of a first device interface, and both the third port and the fourth port are configured to be electrically connected with a clock signal port of a second device interface.

12. The delay control device according to claim 11, wherein in response to the case that the control module disconnects connection between the first interface and the second interface, the control module is further configured to:
suspend the first port;
input a standby signal into the second port;
suspend the third port; and
input the clock signal into the fourth port.

13. The delay control device according to claim 12, wherein the control module disconnects connection between the first interface and the second interface by disconnecting connection between the first port and the third port; and
the control module implements connection between the first interface and the second interface by implementing connection between the first port and the third port.

14. An electronic apparatus, comprising:
the delay control device according to claim 11; and
a first device interface and a second device interface which are connected with the delay control device.

* * * * *